July 14, 1953 R. N. DARROCH 2,645,159
REAR VIEWING SYSTEM FOR VEHICLES
Filed March 19, 1951
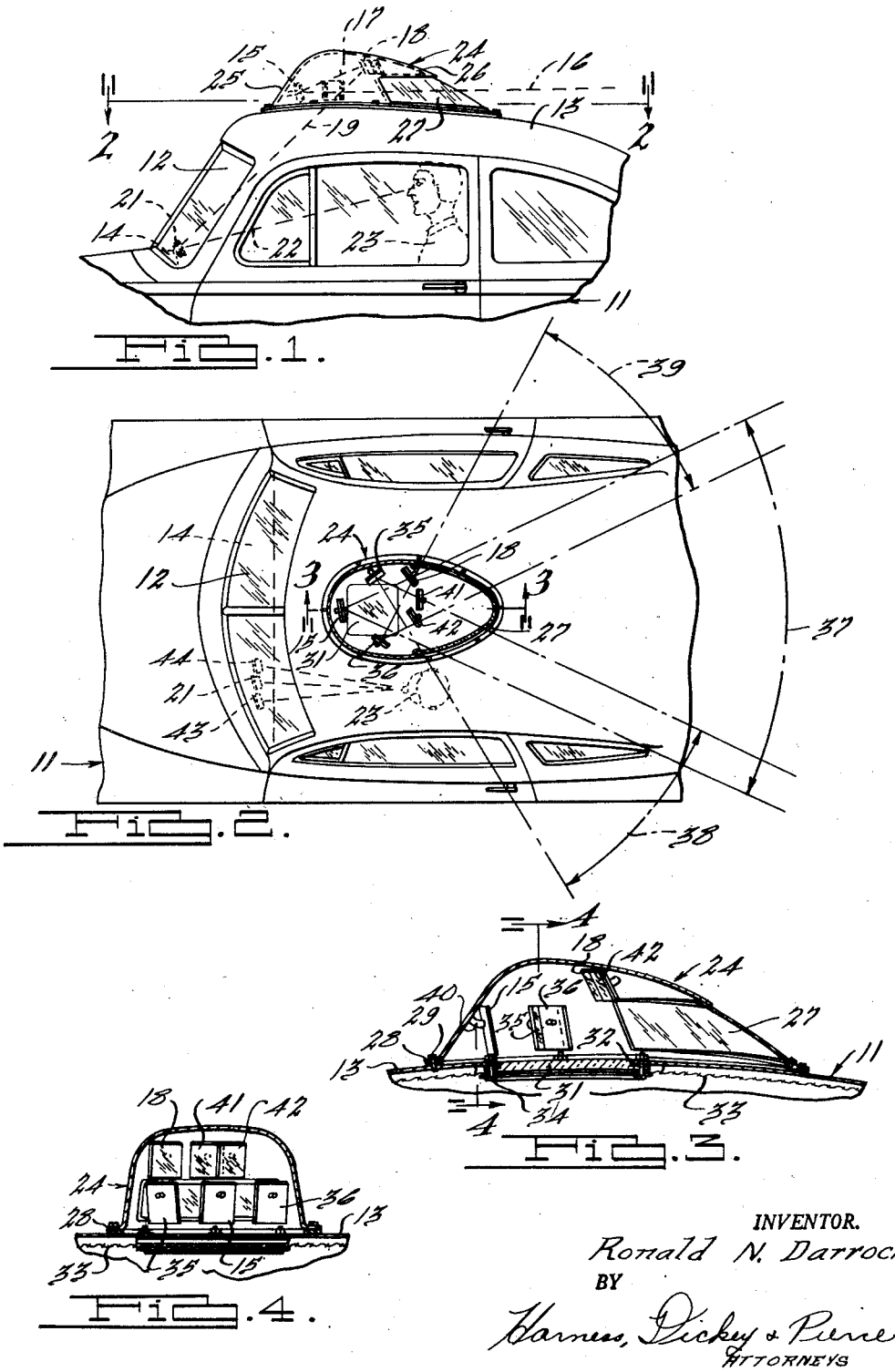
INVENTOR.
Ronald N. Darroch
BY
Harness, Dickey & Pierce
ATTORNEYS Patented July 14, 1953

2,645,159

UNITED STATES PATENT OFFICE 2,645,159

REAR VIEWING SYSTEM FOR VEHICLES

Ronald N. Darroch, Detroit, Mich.

Application March 19, 1951, Serial No. 216,383

3 Claims. (Cl. 88—86)

My invention relates to vehicle viewing devices and more particularly to rear and side viewing arrangements adapted to be installed in automotive vehicles, airplanes, or the like.

In the conventional rear viewing devices now in use on automotive vehicles, busses and trucks, a single or a plurality of mirrors are employed which are directly visible from the operator's station and which reflect images from various areas to the rear of the vehicle. These mirrors are customarily mounted either in the interior of the vehicle, adjacent the upper portion of the windshield, or outside the vehicle, adjacent one of the windshield pillars. As is well known, with these arrangements of mirrors "blind spots" are inevitable since the mirrors reflect images either through the rear window or parallel to the side of the vehicle. Moreover, where more than one mirror is employed, the spaced apart relation of the mirrors requires that the operator look in several directions in order to check the various mirrors before he is cognizant of all the areas reflected by these mirrors.

It is an object of my invention to eliminate the various disadvantages of the present types of rear viewing devices by providing a novel and improved rear viewing arrangement which permits the operator of the vehicle, by a single glance, to simultaneously view all the rear and side quarters without having to turn his head in several directions, and in which the viewing devices will reflect a continuous area to the rear of the vehicle without any blind spots or discontinuous images.

It is another object of my invention to provide an improved viewing device of the above character which is adaptable for use in automotive vehicles, trucks and busses, as well as in airplanes and other vehicles. More particularly, it is an object to provide a viewing system which eliminates the necessity of a rear view mirror mounted at the upper portion of a windshield and reflecting an image through the rear window of such vehicle.

It is a further object of my invention to provide a viewing device comprising a plurality of sets of mirrors, each set having two mirrors mounted above the roof of the vehicle, and a third mirror mounted immediately in front of the operator, preferably on the dash panel of the vehicle. More particularly, it is an object to provide such a viewing device in which each set of mirrors reflects a different quarter to the rear or side of the vehicle, and in which the final mirrors reflect overlapping images and are mounted closely adjacent each other, so that the operator is afforded a panoramic view of the entire rear area by a single glance at these mirrors.

It is another object of my invention to provide a viewing device having the above-described characteristics and in which the mirrors which are mounted above the vehicle roof are entirely enclosed in a dome or housing of attractive shape and contour, the mirrors being protected from weather and dirt as well as from accidental misadjustment or breakage.

Other objects and advantages of the invention will become apparent from the following specification, the accompanying drawing, and the appended claims.

In the drawing:

Figure 1 is a side-elevational view of a portion of an automotive vehicle embodying the viewing device of my invention, showing the path of reflection of a particular image through one set of mirrors;

Figure 2 is a plan cross-sectional view of the vehicle and the viewing device taken along the line 2—2 of Figure 1, showing the angular positioning of the various mirrors;

Figure 3 is a side-elevational view taken in cross section along the line 3—3 of Figure 2, showing the structural details of the housing as well as the supports for the mirrors; and Figure 4 is a cross-sectional view taken along the line 4—4 of Figure 3, showing the lateral positioning of the mirrors within the dome.

Although the principles of my invention are shown for illustrative purposes as embodied in a conventional automotive vehicle, it will be understood that these principles are equally applicable to other types of vehicles, such as trucks or busses, as well as to airplanes, ships and other vehicles.

The automotive vehicle 11 is shown as having the conventional windshield 12, roof 13 and dash panel 14 extending across the vehicle below the windshield. The invention comprises, in general, a plurality of series or sets of mirrors, each set having a primary mirror which faces a rear quarter of the vehicle and receives an image therefrom, an intermediate mirror which receives the reflected image from the primary mirror, and a terminal mirror which is directly visible by the operator and which receives the re-reflected image from the intermediate mirror and, in turn, reflects it toward the eye of the operator.

The principle of operation outlined above may perhaps best be illustrated by a description of the operation of one set of mirrors, as shown in Figure 1. In this figure, the primary mirror 15 receives an image from the rear of the vehicle which travels along the path indicated by the reference numeral 16. As is seen in Figure 1, the primary mirror 15 has a slight upward tilt and reflects the image along path 17 to the intermediate mirror 18, mounted slightly above and to the rear of the primary mirror. Intermediate mirror 18 faces angularly downwardly, and re-reflects the image forwardly and downwardly along the path 19 toward the terminal mirror 21, which is mounted on the dash panel 14. The terminal mirror is so positioned as to reflect the image along the path 22 into the eye of the operator 23. It will be observed that since a total of three mirrors are used, the effect will be the same as if one mirror were used, namely, the finally reflected image will be upright and readily ascertainable to the operator.

The mirrors 15 and 18 are mounted within a dome 24 which surmounts the roof 13 of the vehicle. The dome 24 is preferably of a streamlined contour, as shown in Figures 1 and 2, and has a forward wall 25 of relatively abrupt upward and rearward slope and a rear wall 26 sloping gradually downwardly and rearwardly. The rear portion of the dome is provided with a window 27 which is curved so as to conform to the contour of the dome and which extends entirely around the rear half of the dome, thereby allowing images to be received from all quarters to the rear of the vehicle. As is best seen in Figure 3, the dome is provided with a flanged portion 28 which is secured to the roof 13 by bolts or other fasteners 29, so that the contours of the roof and dome blend together in pleasing fashion. The roof of the vehicle is provided with an opening of appreciable size at an intermediate portion within the confines of dome flange 28, and this opening has a glass window 31 secured thereacross by means of fasteners 32, the headlining 33 of the vehicle being held in position surrounding window 31 by garnish molding 34. It will be noted that the interior of dome 24, therefore, is entirely enclosed, and that no weather or dirt can enter the interior to disturb or damage the mirrors, although the window 31, which is of any transparent material, may be removable for adjusting the mirrors.

In general, the three primary mirrors are mounted on the forward wall 25 of the dome immediately above the roof, whereas the intermediate mirrors are mounted at a level above that of the primary mirrors and on the rear wall 26 of the dome above window 27. As is best seen in Figures 3 and 4, the primary mirrors 15, 35 and 36 are in laterally spaced relation, with mirror 15 disposed between and forwardly of mirrors 35 and 36. Mirror 15 is adapted to reflect an image from the rear central area of the vehicle, as represented by the sector 37 in Fig. 2, and therefore is mounted substantially on the center line of the dome. Mirror 35 is adapted to reflect an image from the left rear quarter of the vehicle, as designated by the sector 38 in Fig. 2 and, therefore, is mounted to the right of the center line of the dome and faces the left portion of window 27. Mirror 36, on the other hand, is adapted to reflect an image from the right rear quarter of the vehicle as represented by the sector 39 of Fig. 2, and, therefore, is mounted to the left of the dome center line facing the right portion of window 27.

The mirrors are preferably secured to the dome wall by an adjustable securing means 40 which may be a ball and socket mount or any other type capable of holding the mirrors stationary against vibration. Fixed mounting means could also be employed if desired, for example where the housing and mirrors are installed as a unit on an assembly line. It will be observed, especially from Fig. 2, that these three primary mirrors are disposed in non-obstructing relation to window 31, so that the intermediate mirrors may readily reflect their images downwardly through said window. It will also be noted that the three primary mirrors have a slight upward tilt, so that images reflected from the roadway to the rear and sides of the vehicle will be reflected upwardly toward the intermediate mirrors and then re-reflected downwardly at a relatively steep inclination through window 31.

The intermediate mirrors 18, 41 and 42, which are mounted near the top of the dome and to the rear of the primary mirrors, reflect, respectively, the images from mirrors 15, 35 and 36. In particular, mirror 18 is mounted to the right of the dome center line and faces diagonally forwardly, the primary mirror 15 being inclined slightly toward the left to reflect into this mirror. Mirror 41 is mounted to the left of mirror 18 but also slightly to the right of the dome center line, this mirror facing substantially the front of the vehicle and receiving the reflected image from primary mirror 35. Mirror 42 is mounted a short distance to the left of the dome center line and faces angularly to the left, this mirror receiving the reflected image from mirror 36. The angular positions of mirrors 18, 41 and 42 are such that they re-reflect the images from their respective primary mirrors through window 31 in a downwardly and forwardly inclined path, the three paths converging toward the terminal mirrors 21, 43 and 44. The mounting means for the intermediate mirrors are preferably similar to those of the primary mirrors, thus allowing for adjustment of these mirrors in obtaining the proper reflecting angle.

It will be observed that the sizes of intermediate mirrors 18, 41 and 42 are relatively smaller than those of their corresponding primary mirrors 15, 35 and 36. The purpose of this difference in size is to insure that the margins of the primary mirrors will not be visible as reflected images from the intermediate mirrors, so that only the reflected images from the rear of the vehicle will be visible to the operator. It is also important to note that the height of the intermediate mirrors is such that the window 27 will be non-obstructed, so that the primary mirrors may reflect a continuous area to the rear of the vehicle.

The terminal mirrors 21, 43 and 44 are preferably mounted in closely adjacent relation at the left-hand portion of the dash panel 14, immediately in front of the operator's station. These mirrors are in turn smaller than their corresponding intermediate mirrors, so that again the margins of these intermediate mirrors will not be visible to the operator. Mirror 21 is adapted to reflect the image from intermediate mirror 18, which, in turn, reflects the image from the rear central area, as represented by the sector 37 in Fig. 2. Mirror 43 is adapted to reflect the image from intermediate mirror 41, that is, front the left rear sector 37. Mirror 44 reflects the image from intermediate mirror 42, thus revealing the right rear quarter 38 of the vehicle. It will be noted that the lateral positioning of mirrors 21, 43 and 44 is such that mirror 21 is intermediate the other two mirrors, so that the view of the left rear quarter appears to the left of the center rear view and the view of the right rear quarter appears to the right of the center rear view. The operator is thus immediately oriented, since he is accustomed to thinking of the rear quarters of the vehicle as being symmetrically opposite the forward quarters.

It is important to observe that the positioning of the terminal mirrors on the dash panel is made possible by the particular arrangement of the primary and intermediate mirrors, since the location of the intermediate mirrors above and behind the primary mirrors imparts a steep angularity to the image paths 19, which thereby clear the head of operator 23 in arriving at the dash panel 14.

It is thus apparent that a device is provided which enables the operator to immediately receive complete visual information as to his surroundings, without having to move his head to either side or to look in more than one direction. It will be noted from Fig. 2 that the sectors 38 and 39 overlap the central sector 37, so that there are no blind spots which might conceal other moving vehicles. The terminal mirrors 21, 43 and 44 are so positioned as to be in non-obstructing relation with the windshield 12, so that the entire area of the windshield is available to the operator. It will also be obvious that additional sets of mirrors may be employed other than those already described. In particular, in the case of an airplane, it would be possible to provide a fourth set of mirrors, reflecting the area above the plane, in addition to the three sets for the rear quarters of the craft.

While it will be apparent that the preferred embodiment of the invention herein disclosed is well calculated to fulfill the objects above stated, it will be appreciated that the invention is susceptible to modifications, variations and change without departing from the proper scope or fair meaning of the subjoined claims.

What is claimed is:

1. In a wide angle viewing system for a vehicle having a roof and a dash panel, a dome-like housing of streamlined shape surmounting said roof and having a rounded opening at the lower rear and rear side portions thereof, and a plurality of sets of mirrors for directing images received through said opening to the vehicle operator, each of said sets of mirrors comprising a primary mirror mounted within the housing and positioned to receive an image through a portion of said rounded opening, an intermediate mirror mounted within the upper portion of said dome-like housing in non-obstructing relation with said opening and above said opening and said primary mirror, said intermediate mirror being tilted downwardly and receiving the reflected image from said primary mirror, and a terminal mirror mounted within said vehicle, the vehicle having an opening for transmitting the re-reflected image from said intermediate mirror to said terminal mirror, the terminal mirrors of said sets being in closely adjacent relation, all of said mirrors being angularly placed so as to cooperate to show a panoramic view.

2. The combination according to claim 1, said vehicle opening being disposed in the roof of said vehicle, and a window across said opening and contiguous with said roof, said re-reflected images being transmitted through said window at a relatively steep angularity to minimize the refractive effect through said window.

3. The combination according to claim 1, further provided with a window across said housing opening, said window being of curved shape, said primary mirrors facing so as to receive overlapping images from the rear and side quarters of the vehicle.

RONALD N. DARROCH.

References Cited in the file of this patent

UNITED STATES PATENTS

| Number | Name | Date |
|---|---|---|
| 1,420,145 | Rees | June 20, 1922 |
| 1,643,420 | Porter | Sept. 27, 1927 |
| 2,221,449 | Hoeninghausen | Nov. 12, 1940 |
| 2,252,161 | Borba | Aug. 12, 1941 |
| 2,375,134 | Ptacek | May 1, 1945 |
| 2,569,576 | Ramme | Oct. 2, 1951 |

FOREIGN PATENTS

| Number | Country | Date |
|---|---|---|
| 306,175 | Great Britain | Feb. 18, 1929 |